United States Patent
Mensch et al.

(10) Patent No.: US 11,560,049 B2
(45) Date of Patent: *Jan. 24, 2023

(54) FILL LIMIT VENTING VALVE WITH HIGH SHUT-OFF HEIGHT

(71) Applicant: Eaton Intelligent Power Limited, Dublin (IE)

(72) Inventors: Martin Mensch, Portland, OR (US); Tamara Orshanskaya, Farmington Hills, MI (US); Jing Xu, Ann Arbor, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/369,085

(22) Filed: Jul. 7, 2021

(65) Prior Publication Data
US 2021/0331582 A1    Oct. 28, 2021

Related U.S. Application Data

(63) Continuation of application No. 16/401,222, filed on May 2, 2019, now Pat. No. 11,059,368, which is a continuation of application No. PCT/US2017/059441, filed on Nov. 1, 2017.

(60) Provisional application No. 62/459,747, filed on Feb. 16, 2017, provisional application No. 62/416,653, filed on Nov. 2, 2016.

(51) Int. Cl.
*B60K 15/035* (2006.01)
*F16K 1/30* (2006.01)
(Continued)

(52) U.S. Cl.
CPC ........ *B60K 15/03519* (2013.01); *B60K 15/03* (2013.01); *B60K 15/035* (2013.01);
(Continued)

(58) Field of Classification Search
CPC .............. B60K 15/03519; B60K 15/03; B60K 15/035; B60K 15/03504;
(Continued)

(56) References Cited

U.S. PATENT DOCUMENTS 5,605,175 A    2/1997  Bergsma et al.
5,988,201 A   11/1999  Lebkuchner et al.
(Continued)

FOREIGN PATENT DOCUMENTS

CN    101782159 A    7/2010
CN    103790744 A    5/2014
(Continued)

OTHER PUBLICATIONS

Chinese Office Action for CN Application No. 201780077152.3 dated Jan. 25, 2022.
(Continued)

*Primary Examiner* — Patrick C Williams
(74) *Attorney, Agent, or Firm* — RMCK Law Group PLC

(57) ABSTRACT

A fill limit vent valve for a fuel system includes a housing assembly, an outlet port and a flow dam. The housing assembly has a main housing including a cylindrical body and an upper housing portion. The upper housing portion has a lower wall that defines an orifice and an outer cylindrical wall that defines an upper housing chamber. The outlet port is formed on the main housing and fluidly communicates fuel vapor out of the fill limit valve. The orifice is offset from a centerpoint of the lower wall in a direction away from the outlet port. The flow dam extends from the lower wall into the upper housing chamber and connects on opposite ends to the outer cylindrical wall. The flow dam and upper housing chamber cooperating to form a liquid trap that mitigates the possibility of liquid fuel from reaching the outlet port from the orifice.

19 Claims, 5 Drawing Sheets

(51) Int. Cl.
*F16K 24/04* (2006.01)
*B60K 15/03* (2006.01)
*F16K 33/00* (2006.01)

(52) U.S. Cl.
CPC ........ *B60K 15/03504* (2013.01); *F16K 1/304* (2013.01); *F16K 1/307* (2013.01); *F16K 24/048* (2013.01); *B60K 2015/03019* (2013.01); *B60K 2015/03514* (2013.01); *B60K 2015/03576* (2013.01); *F16K 33/00* (2013.01)

(58) Field of Classification Search
CPC ........... B60K 2015/03019; B60K 2015/03514; B60K 2015/03576; F16K 1/304; F16K 1/307; F16K 24/048; F16K 33/00
See application file for complete search history.

(56) References Cited

U.S. PATENT DOCUMENTS

| | | |
|---|---|---|
| 6,405,747 B1 | 6/2002 | King et al. |
| 6,425,379 B2 | 7/2002 | Shimamura et al. |
| 6,708,713 B1 | 3/2004 | Gericke |
| 8,360,089 B2 | 1/2013 | Hirata |
| 2004/0055638 A1 | 3/2004 | Yamada et al. |
| 2006/0070656 A1 | 4/2006 | Crawford |
| 2007/0079872 A1 | 4/2007 | Leonhardt |
| 2007/0284001 A1 | 12/2007 | Yamada |
| 2013/0025700 A1 | 1/2013 | Kito et al. |
| 2016/0177885 A1* | 6/2016 | Mihara .............. F02M 25/0836 137/202 |
| 2017/0350521 A1 | 12/2017 | Ogiwara et al. |

FOREIGN PATENT DOCUMENTS

| | | |
|---|---|---|
| CN | 105711408 A | 6/2016 |
| CN | 103813921 A | 8/2016 |
| WO | 2007088023 A1 | 8/2007 |

OTHER PUBLICATIONS

International Search Report and Written Opinion for International Application No. PCT/US2017/059441 dated Feb. 26, 2018, 16 pages.
U.S. Appl. No. 16/401,222, filed May 2, 2019.
Second Chinese Office Action for CN Application No. 201780077152.3 dated Aug. 30, 2022.

* cited by examiner

FILL LIMIT VENTING VALVE WITH HIGH SHUT-OFF HEIGHT

CROSS REFERENCE TO RELATED APPLICATIONS

This application is a continuation of U.S. patent application Ser. No. 16/401,222 filed May 2, 2019, which is a continuation of International Application No. PCT/US2017/059441 filed Nov. 1, 2017, which claims the benefit of U.S. Patent Application No. 62/416,653 filed on Nov. 2, 2016 and U.S. Patent Application No. 62/459,747 filed on Feb. 16, 2017. The disclosures of the above applications are incorporated herein by reference.

FIELD

The present disclosure relates generally to fuel tanks on passenger vehicles and more particularly to a fill limit venting valve (FLVV) having high shut-off height (SOH) and low liquid carry over.

BACKGROUND

A vehicle fuel tank can include an FLVV that communicates with a fuel tank. The FLVV can allow air and/or fuel vapor to escape the fuel tank as the fuel tank is being filled. The FLVV communicates with a filler nozzle during refueling to turn off the flow of fuel from the filler nozzle when a predetermined fuel level is reached. It is desirable to have the predetermined fuel level correspond to a fuel tank fill level that has a high SOH or is as full as possible. It can be challenging to provide an FLVV that satisfies a high SOH while also meeting Low Emission Vehicle III (LEV III) standards.

The background description provided herein is for the purpose of generally presenting the context of the disclosure. Work of the presently named Inventor, to the extent it is described in this background section, as well as aspects of the description that may not otherwise qualify as prior art at the time of filing, are neither expressly nor impliedly admitted as prior art against the present disclosure.

SUMMARY

A fill limit vent valve for a fuel system having a fuel tank includes a housing assembly, an outlet port and a flow dam. The housing assembly has a main housing including a cylindrical body and an upper housing portion. The upper housing portion has a lower wall that defines an orifice and an outer cylindrical wall that defines an upper housing chamber. The outlet port is formed on the main housing and fluidly communicates fuel vapor out of the fill limit valve. The orifice is offset from a centerpoint of the lower wall in a direction away from the outlet port. The flow dam extends from the lower wall into the upper housing chamber and connects on opposite ends to the outer cylindrical wall. The flow dam and upper housing chamber cooperating to form a liquid trap that mitigates the possibility of liquid fuel from reaching the outlet port from the orifice.

According to additional features the outlet port includes an entry opening that defines a port diameter. The lower wall extends along a plane that intersects the port diameter. The main housing defines a first cylinder and the upper housing defines a second cylinder. The first cylinder extends up into the second cylinder whereby an annular ledge is formed. The flow dam partitions the upper housing chamber into an orifice side cavity and a nozzle side cavity. The flow dam is non-planar. The housing further comprises a float guide that defines a float cavity that receives a float.

According to other features, the fill limit vent valve further comprises a ribbon connected between the float and the main housing. The ribbon is configured to selectively overlay and seal the orifice and preclude airflow through the orifice. The housing assembly further comprises a bucket that defines the float guide. The bucket defines at least one aperture that fluidly communicates between an interior of the fuel tank and an interior cavity of the float. A weld pad is configured to melt into an inner surface of the fuel tank during an assembly process to mount the fill limit vent valve to an inner surface of the fuel tank. A cover is coupled to the upper housing portion. The cover is separately formed from the main housing and subsequently coupled to the main housing forming an upper boundary of the upper housing chamber.

A fill limit vent valve for a fuel system having a fuel tank includes a housing assembly and an outlet port. The housing assembly has a main housing including a cylindrical body and an upper housing portion. The upper housing portion has a lower wall that defines an orifice and an outer cylindrical wall that defines an upper housing chamber. The outlet port is formed on the main housing and fluidly communicates fuel vapor out of the fill limit vent valve. The orifice is offset from a centerpoint of the lower wall in a direction away from the outlet port. The outlet port includes an entry opening that defines a port diameter. The lower wall extends along a plane that intersects the port diameter.

According to additional features, the main housing defines a first cylinder and the upper housing defines a second cylinder. The first cylinder extends up into the second cylinder whereby an annular ledge is formed. The housing assembly further comprises a float guide that defines a float cavity that receives a float. A ribbon is connected between the float and the main housing. The ribbon is configured to selectively overlay and seal the orifice and preclude airflow through the orifice.

In other features, the housing assembly further comprises a bucket that defines the float guide. The bucket defines at least one aperture that fluidly communicates between an interior of the fuel tank and an interior cavity of the float. A weld pad is configured to melt into an inner surface of the fuel tank during an assembly process to mount the fill limit vent valve to an inner surface of the fuel tank. A flow dam extends from the lower wall into the upper housing chamber. The flow dam connects on opposite ends to the outer cylindrical wall. The flow dam and upper housing chamber cooperate to form a liquid trap that mitigates the possibility of liquid fuel from reaching the outlet port from the orifice. The flow dam partitions the upper housing chamber into an orifice side cavity and a nozzle side cavity. The orifice side cavity has more volume than the nozzle side cavity. The flow dam extends in a wave-like pattern.

BRIEF DESCRIPTION OF THE DRAWINGS

The present disclosure will become more fully understood from the detailed description and the accompanying drawings, wherein.

DETAILED DESCRIPTION

As will be described herein, the present disclosure provides an FLVV that has a very high shut-off height, meets LEV III fuel emission control regulations and prevents excessive liquid carry over. The FLVV is internally mounted to a fuel tank via a weld pad that melts into the tank wall with sacrificial features. The design is modular to achieve multiple shut-off heights.

Figure 1:
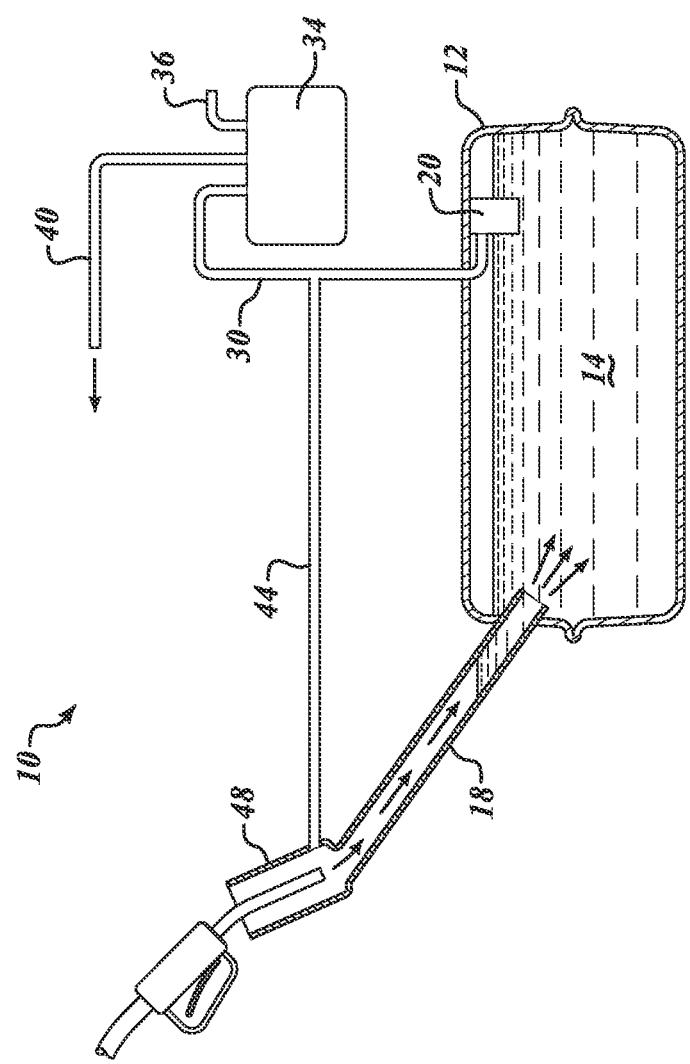
FIG. 1 is a schematic illustration of a fuel tank system and having an FLVV constructed in accordance to one example of the present disclosure.
Figure 3:
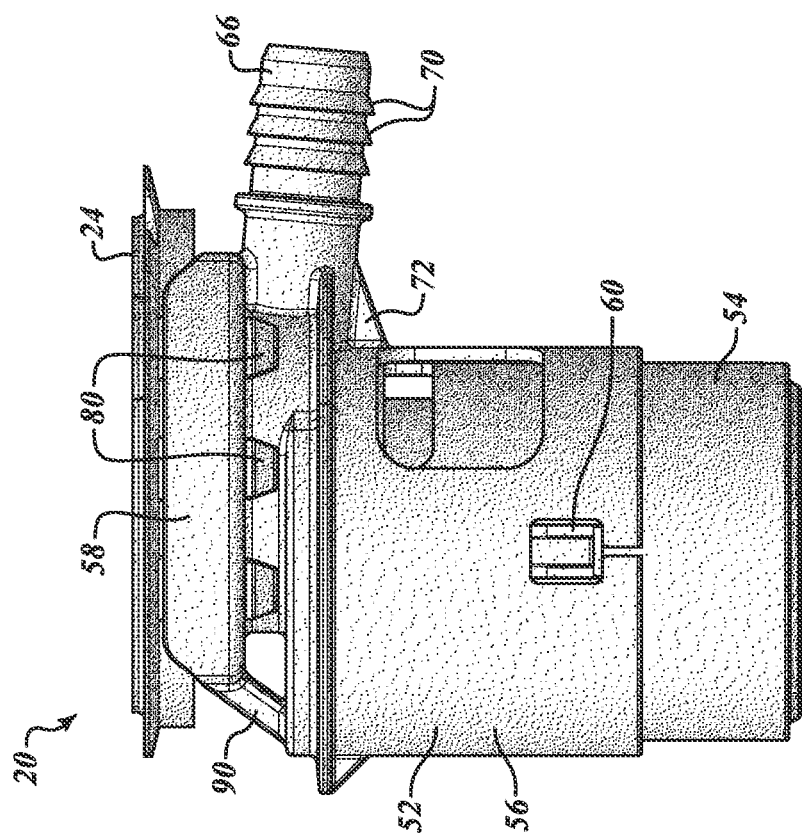
FIG. 3 is a side view of the FLVV of FIG. 2.
Figure 2:
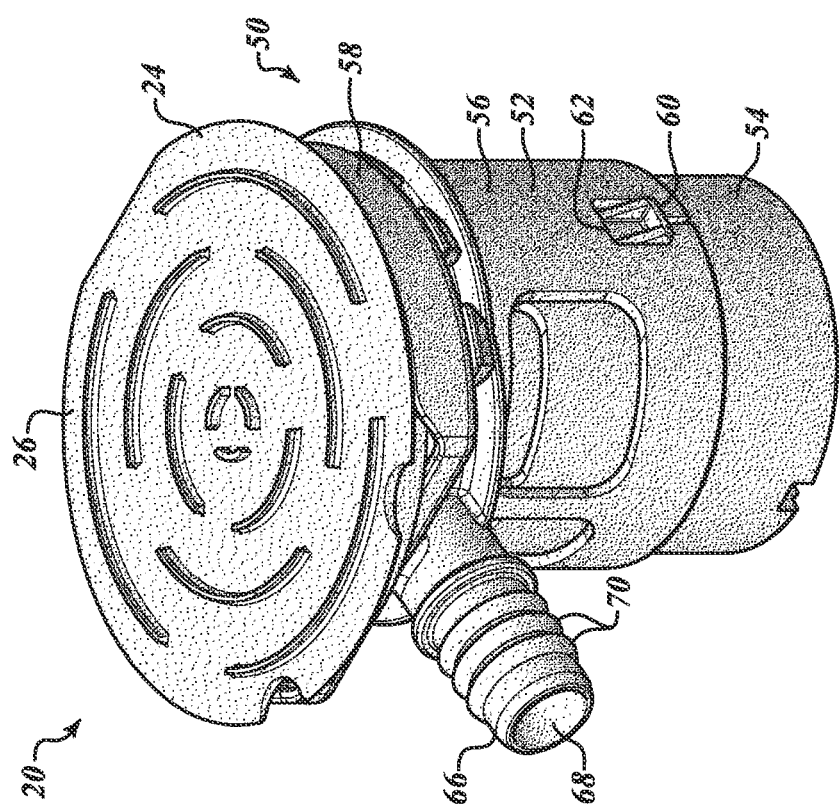
FIG. 2 is a perspective view the FLVV shown in FIG. 1.
Figure 5:
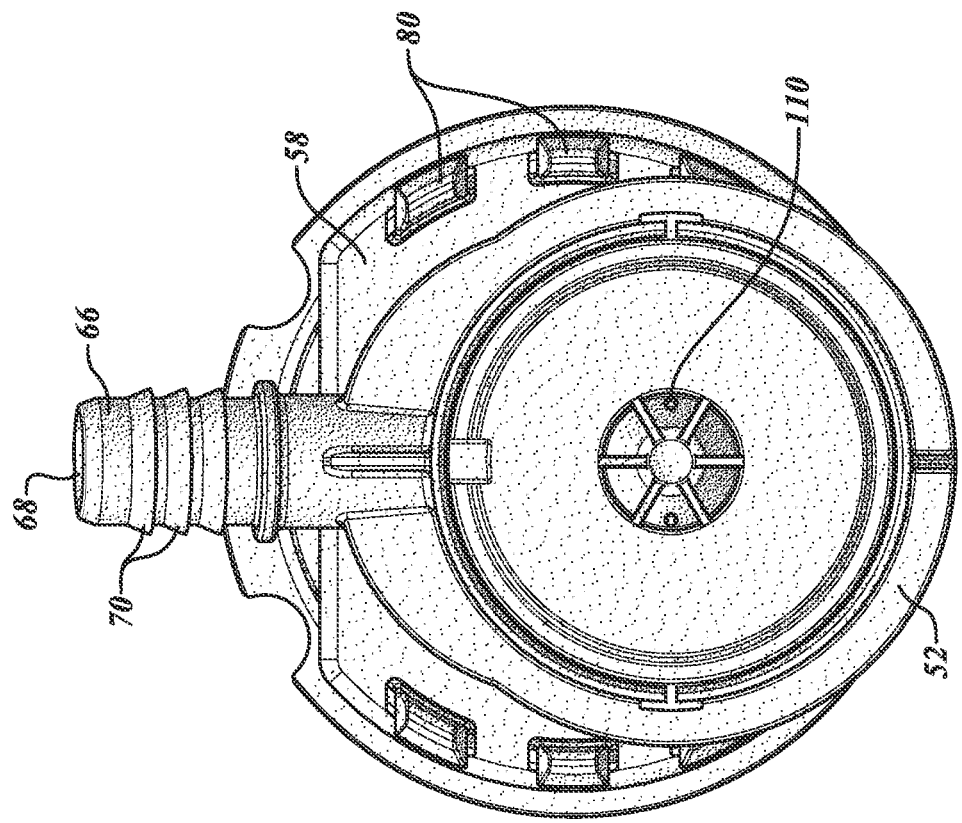
FIG. 5 is a bottom view of the FLVV of FIG. 2.
Figure 4:
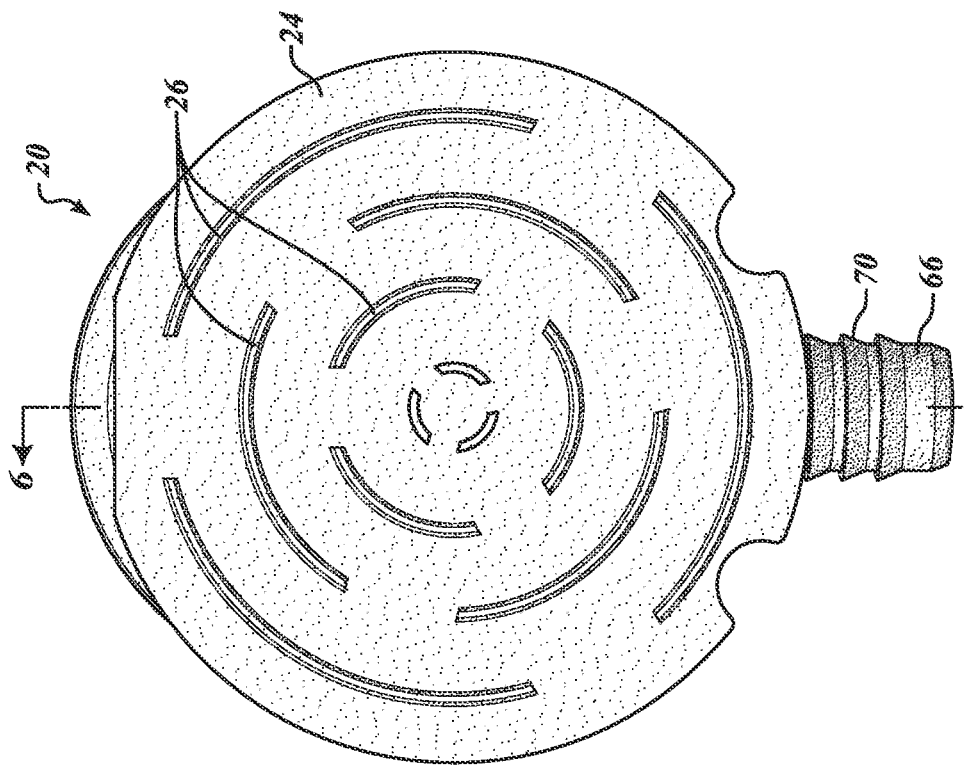
FIG. 4 is a top view of the FLVV of FIG. 2.
Figure 6:
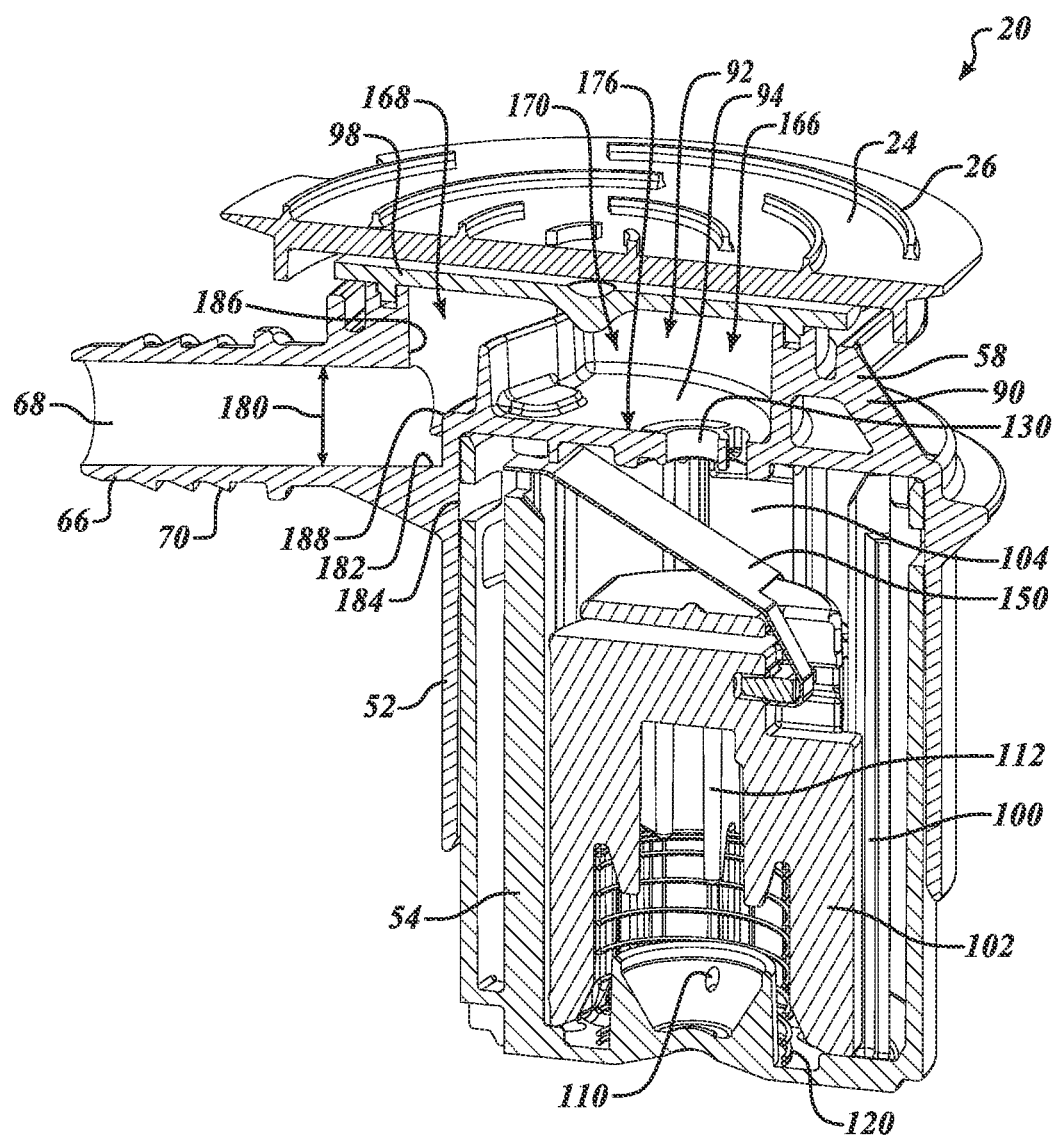
FIG. 6 is a cross-sectional view of the FLVV taken along lines 6-6 of FIG. 4.
Figure 7:
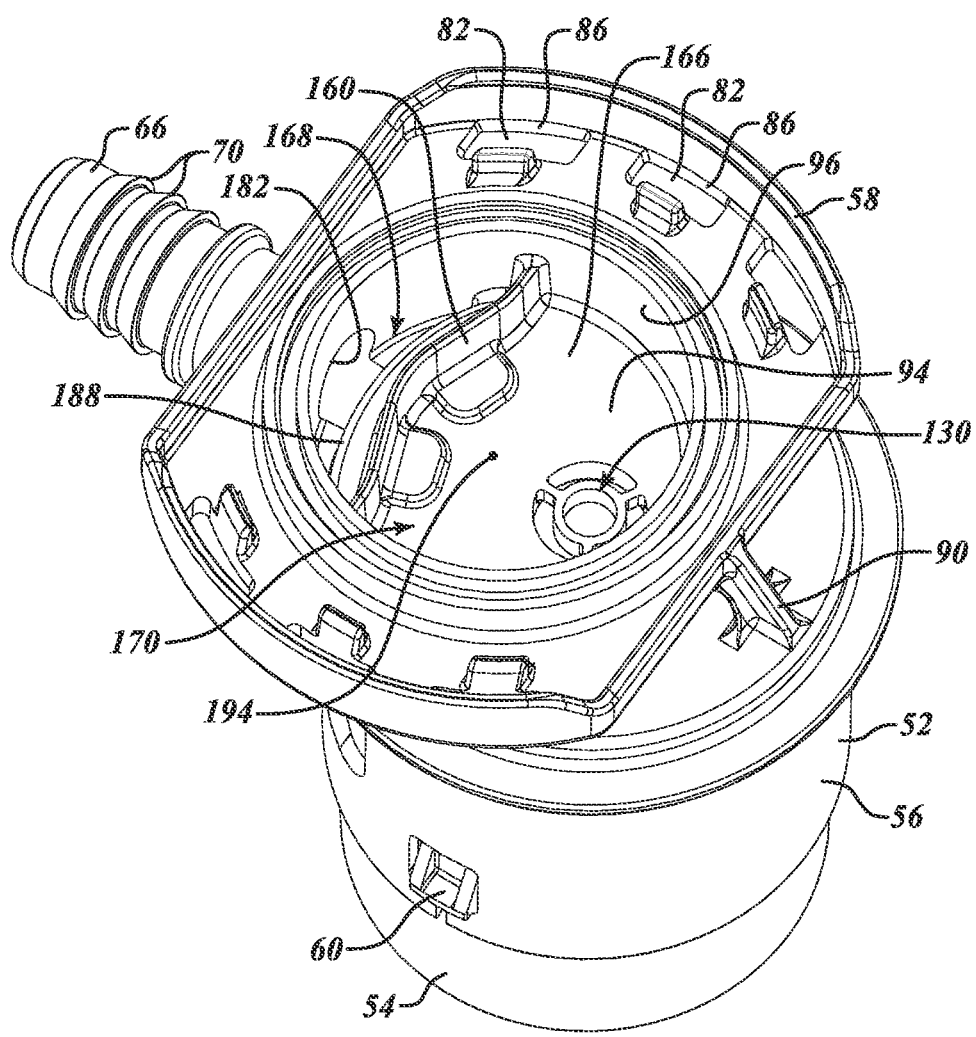
FIG. 7 is a top perspective view of the FLVV of FIG. 2 and shown with the weld pad removed.

With initial reference to FIGS. 1 and 2 a fuel tank system constructed in accordance to one example of the present disclosure is shown and generally identified at reference 10. The fuel tank system 10 includes a fuel tank 12 that receives and stores liquid fuel 14 through a filler pipe 18. An FLVV 20 is internally mounted to the fuel tank 12 via a weld pad 24 that melts into the fuel tank 12 wall with sacrificial features or ribs 26 during an assembly process. The configuration of the ribs 26 is merely exemplary and other geometries may be used. In other examples, the ribs 26 may be omitted in part or entirely. The FLVV 20 is fluidly connected by way of a conduit or vapor purge line 30 to a storage canister 34 which is vented through an atmospheric air inlet tube 36. The storage canister 34 has a purge line 40 connected thereto and adapted for connection to the vehicle engine (not shown) for enabling flow of vapor therethrough during startup.

A vapor recirculation line 44 can have one end connected to the upper end of a filler neck 48 of the filler pipe 18. The opposite end of the recirculation line 44 is connected into the vapor purge line 30 for providing recirculation of a portion of the vapor flowing through the vapor purge line 30. The recirculation can be facilitated by the aspiration effect of the flow of the fuel in the filler neck 48 during refueling. Other configurations are contemplated.

With additional reference now to FIGS. 3-7 the FLVV 20 will be further described. The FLVV 20 includes a housing assembly 50 having a main housing 52 and a bucket 54 that is snappingly received by the main housing 52. The main housing 52 includes a cylindrical body 56 and an upper housing portion 58. The bucket 54 is partially received by an inner diameter of the main housing 52 and has tangs 60 that ramp and locate into corresponding apertures 62 defined in the main housing 52. The main housing 52 includes an outlet port or nozzle 66 that defines an opening 68. The nozzle 66 is fluidly connected to the vapor purge line 30 and the vapor recirculation line 44.

Barb ribs 70 are formed around the nozzle 66. A support rib 72 (FIG. 3) extends between the cylindrical body 56 and the nozzle 66. The weld pad 24 includes tangs 80 that are received by apertures 82 defined in the upper housing portion 58. The tangs 80 ramp along surfaces 86 (FIG. 7) in the upper housing portion 58 before being snappingly received by the apertures 82 in a secure position. An angled connection arm 90 extends between the main housing 52 and the upper housing 58. The upper housing 58 defines an upper housing chamber 92 (FIG. 6) defined generally by a lower wall 94, and an outer cylindrical wall 96. The upper housing chamber 92 is closed by a cover 98. The cover 98 can be sonic welded or otherwise attached to the main housing 52.

The housing assembly 50 includes a float guide 100 that receives a float 102. Specifically, the float guide 100 defines a float cavity 104 that receives the float 102. In one example, the bucket 54 defines the float guide 100 that houses the float 102. The bucket 54 can define at least one aperture 110 that fluidly communicates between the interior of the fuel tank 12 and an interior cavity 112 of the float 102. The float guide 100 can guide the motion of the float 102 as the level of liquid fuel in the fuel tank 12 rises. A biasing member 120 can maintain the float 102 in a predetermined position when the level of liquid fuel in the fuel tank 12 reaches a predetermined level to limit the extent of travel of the float 102.

The lower wall 94 of the upper housing 58 defines an orifice 130. The orifice 130 connects the float cavity 104 to the upper housing chamber 92. A ribbon 150 is connected between the float 102 and the main housing 52. The ribbon 150 is formed of an elastomeric material such as photo silicone rubber. When the fuel level rises in the fuel tank 12, air pressure is displaced lifting the float 102. When the float 102 is raised enough, the ribbon 150 overlays and seals the orifice 130 and precludes airflow through the orifice 130. The ribbon 150 also precludes liquid fuel from flowing through the orifice 130 and out of the nozzle 66 in the closed position.

The upper housing 58 includes a flow dam 160 extending upward from the lower wall 94 into the upper housing chamber 92. The flow dam 160 extends in a wave-like pattern and is generally non-planar. The flow dam 160 connects on opposite ends to the outer cylindrical wall 96. The cover 98 generally defines an upper boundary of the upper housing chamber 92. The flow dam 160 generally partitions the upper housing chamber 92 into an orifice side cavity 166 and a nozzle side cavity 168. Because the cover 98 is a separately formed component that is coupled to the main housing 52 during an assembly step, the features of the upper housing 58, including the flow dam 160 can be integrally molded during formation of the upper housing 58.

The design of the FLVV 20 allows for a liquid trap 170 to be formed in the upper housing chamber 92. The liquid trap 170 mitigates the risk of liquid fuel carryover. Explained further, any liquid fuel that may splash through or otherwise enter the upper housing chamber 92 through the orifice 130 will be retained in the orifice side cavity 166, blocked from passing to the nozzle side cavity 168 by the flow dam 160, and allowed to drain back through the orifice 130. In other words, the liquid trap 170 inhibits liquid fuel from freely passing through the orifice 130 and out through the opening 68 of the nozzle 66.

Additional features of the liquid trap 170 will be described. As noted above, the FLVV 20 allows for a very high SOH. Notably, the lower wall 94 extends along a plane 176 that intersects a port diameter 180 defined by an entry opening or port 182 of the nozzle 66. In this regard, the lowest point of the liquid trap 170 provided by the lower wall 94 is elevated relative to the lowest point of the entry port 182. Explained differently, the main housing 52 defines a first cylinder 184 while the upper housing 58 defines a second cylinder 186. The first cylinder 184 extends up into the second cylinder 186 whereby an annular ledge 188 is formed. As the first cylinder 184 is raised into the second cylinder 186 a higher SOH can be attained.

In addition, the orifice 130 is offset from a centerpoint 194 of the lower wall 94 in a direction away from the entry port 182 of the nozzle 66. Shifting the orifice 130 to an offset position allows for additional space to incorporate the flow dam 160 and still have room to integrate the entry port 182 of the nozzle 66 without compromising airflow (into the upper housing chamber 92 through the orifice 130 and out of the upper housing chamber 92 through the entry port 182 of the nozzle 66).

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A fill limit vent valve for a fuel system having a fuel tank, the fill limit vent valve comprising:
    a housing assembly having a main housing including a cylindrical body and an upper housing portion, the upper housing portion having a lower wall that extends along a plane and further defines an orifice and an outer cylindrical wall that defines an upper housing chamber;
    an outlet port that defines a port diameter and is formed on the housing assembly, the outlet port configured to fluidly communicate fuel vapor out of the fill limit vent valve, the plane positioned so as to intersect the port diameter, the orifice being offset from a centerpoint of the lower wall in a direction away from the outlet port;
    and a non-planar flow dam extending from the lower wall into the upper housing chamber and that connects on opposite ends to the outer cylindrical wall, the flow dam and upper housing chamber cooperating to form a liquid trap that mitigates the possibility of liquid fuel reaching the outlet port from the orifice.

2. The fill limit vent valve of claim 1 wherein the flow dam is integrally molded with the upper housing portion.

3. The fill limit vent valve of claim 1 wherein the main housing defines a first cylinder and the upper housing portion defines a second cylinder, wherein the first cylinder extends up into the second cylinder whereby an annular ledge is formed.

4. The fill limit vent valve of claim 1 wherein the flow dam partitions the upper housing chamber into an orifice side cavity and a nozzle side cavity.

5. The fill limit vent valve of claim 4 wherein the flow dam extends in a wave-like pattern.

6. The fill limit vent valve of claim 4 wherein the housing assembly further comprises a float guide that defines a float cavity that receives a float.

7. The fill limit vent valve of claim 6, further comprising a ribbon connected between the float and the main housing, the ribbon configured to selectively overlay and seal the orifice and preclude airflow through the orifice.

8. The fill limit vent valve of claim 6 wherein the housing assembly further comprises a bucket that defines the float guide, the bucket defining at least one aperture that fluidly communicates between an interior of the fuel tank and an interior cavity of the float.

9. The fill limit vent valve of claim 1, further comprising a weld pad configured to melt into an inner surface of the fuel tank during an assembly process to mount the fill limit vent valve to an inner surface of the fuel tank.

10. The fill limit vent valve of claim 9, further comprising a cover that is coupled to the upper housing portion, the cover being separately formed from the main housing and subsequently coupled to the main housing forming an upper boundary of the upper housing chamber.

11. A fill limit vent valve for a fuel system having a fuel tank, the fill limit vent valve comprising:
    a housing assembly having a cylindrical body and an upper housing portion, the upper housing portion having a lower wall that comprises an orifice and an outer cylindrical wall that defines an upper housing chamber, wherein the housing assembly further comprises a float guide that defines a float cavity that receives a float,
    an outlet port formed on the housing assembly that fluidly communicates fuel vapor out of the fill limit vent valve, the orifice being offset from a centerpoint of the lower wall in a direction away from the outlet port, wherein the lower wall extends along a plane that intersects the outlet port;
    a ribbon connected between the float and the housing assembly, the ribbon configured to selectively overlay and seal the orifice and preclude airflow through the orifice; and
    a flow dam extending from the lower wall into the upper housing chamber and that connects on opposite ends to the outer cylindrical wall, the flow dam and upper housing chamber cooperating to form a liquid trap that mitigates the possibility of liquid fuel from reaching the outlet port from the orifice.

12. The fill limit vent valve of claim 11 wherein the housing assembly comprises a first cylinder and the upper housing portion defines a second cylinder, wherein the first cylinder extends up into the second cylinder whereby an annular ledge is formed.

13. The fill limit vent valve of claim 11 wherein the flow dam is integrally molded with the upper housing portion.

14. The fill limit vent valve of claim 13 wherein the housing assembly further comprises a bucket that defines the float guide, the bucket defining at least one aperture that fluidly communicates between an interior of the fuel tank and an interior cavity of the float.

15. The fill limit vent valve of claim 11, further comprising a weld pad configured to melt into an inner surface of the fuel tank during an assembly process to mount the fill limit vent valve to an inner surface of the fuel tank.

16. The fill limit vent valve of claim 11 wherein the flow dam is non-planar.

17. The fill limit vent valve of claim 16 wherein the flow dam extends in a wave-like pattern.

18. The fill limit vent valve of claim 11 wherein the flow dam partitions the upper housing chamber into an orifice side cavity and a nozzle side cavity, the orifice side cavity having more volume than the nozzle side cavity.

19. A fill limit vent valve for a fuel system having a fuel tank, the fill limit vent valve comprising:
    a housing assembly having a cylindrical body and an upper housing portion, the upper housing portion having a lower wall that defines an orifice and an outer cylindrical wall that defines an upper housing chamber;
    a non-planar flow dam extending from the lower wall into the upper housing chamber, wherein the flow dam partitions the upper housing chamber into an orifice side cavity and a nozzle side cavity, the orifice side cavity having more volume than the nozzle side cavity; and
    an outlet port formed on the housing assembly that fluidly communicates fuel vapor out of the fill limit vent valve, wherein the outlet port includes an entry opening that defines a port diameter, wherein the lower wall extends along a plane that intersects the port diameter, the orifice being offset from a centerpoint of the lower wall in a direction away from the outlet port.

\* \* \* \* \*